(12) United States Patent
Fang et al.

(10) Patent No.: US 11,127,115 B2
(45) Date of Patent: Sep. 21, 2021

(54) DETERMINATION OF DISPARITY

(71) Applicant: NEXTVPU (SHANGHAI) CO., LTD., Shanghai (CN)

(72) Inventors: Shu Fang, Shanghai (CN); Ji Zhou, Shanghai (CN); Xinpeng Feng, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/131,463

(22) Filed: Dec. 22, 2020

(65) Prior Publication Data

US 2021/0183014 A1    Jun. 17, 2021

Related U.S. Application Data

(63) Continuation of application No. PCT/CN2020/121857, filed on Oct. 19, 2020.

(30) Foreign Application Priority Data

Dec. 13, 2019 (CN) .......................... 201911289524.6

(51) Int. Cl.
*G06K 9/46* (2006.01)
*G06T 3/40* (2006.01)

(52) U.S. Cl.
CPC .............. *G06T 3/4046* (2013.01); *G06K 9/46* (2013.01)

(58) Field of Classification Search
CPC ................................ G06T 3/4046; G06K 9/46
USPC ....... 382/100, 106, 107, 153, 154, 181, 209, 382/190, 195, 199, 254, 298; 348/42, 43, 348/46, 50, E13.001, E13.002, E13.003, 348/E13.004, E13.014, E13.026, E13.036, 348/E13.038, E13.025, E13.005, E13.008, 348/E13.037, E13.04, E13.059, E13.058, 348/E13.022, E13.023, E13.027, E13.029, 348/E13.06
See application file for complete search history.

(56) References Cited

U.S. PATENT DOCUMENTS 8,737,723 B1 * 5/2014 Kwatra ................. G06T 15/205
382/154
2012/0008857 A1   1/2012 Choi
(Continued)

FOREIGN PATENT DOCUMENTS

CN        105335934 A     2/2016
CN        107392943 A    11/2017
(Continued)

*Primary Examiner* — Sheela C Chawan
(74) *Attorney, Agent, or Firm* — Seed IP Law Group LLP

(57) ABSTRACT

A disparity determining method, an electronic device, and a computer-readable storage medium are provided. The disparity determining method includes: downsampling a first image and a second image, to obtain a first image with a first size and a second image with the first size; performing first-stage disparity computation on the first image with the first size and the second image with the first size, to obtain a first disparity map with the first size; and performing second-stage disparity computation on a first image with a second size and a second image with the second size based on an upsampled disparity map, with the second size, of the first disparity map, to obtain a second disparity map with the second size.

20 Claims, 6 Drawing Sheets

(56) References Cited

U.S. PATENT DOCUMENTS

| | | | |
|---|---|---|---|
| 2014/0160247 A1* | 6/2014 | Shi | H04N 13/239 |
| | | | 348/47 |
| 2014/0198977 A1 | 7/2014 | Narasimha et al. | |
| 2016/0012567 A1* | 1/2016 | Siddiqui | G06T 3/4007 |
| | | | 382/154 |
| 2017/0272727 A1 | 9/2017 | Jiang et al. | |
| 2019/0004533 A1* | 1/2019 | Huang | G06K 9/4628 |
| 2019/0004535 A1* | 1/2019 | Huang | G05D 1/0251 |
| 2019/0213749 A1 | 7/2019 | Li et al. | |
| 2020/0099920 A1* | 3/2020 | Khamis | H04N 13/271 |

FOREIGN PATENT DOCUMENTS

| | | |
|---|---|---|
| CN | 108230235 A | 6/2018 |
| CN | 108401460 A | 8/2018 |
| CN | 109472819 A | 3/2019 |
| CN | 110060283 A | 7/2019 |
| CN | 110427968 A | 11/2019 |
| JP | 2008039491 A | 2/2008 |
| JP | 2015534745 A | 12/2015 |
| JP | 2017-520852 A | 7/2017 |
| JP | 2019-96294 A | 6/2019 |
| JP | 2019-121349 A | 7/2019 |
| KR | 101178015 B1 | 8/2012 |
| KR | 10-2014-0125039 A | 10/2014 |
| KR | 20150070629 A | 6/2015 |
| KR | 20170031691 A | 3/2017 |
| KR | 101957089 B1 | 3/2019 |
| WO | 2012117706 A1 | 9/2012 |

\* cited by examiner

DETERMINATION OF DISPARITY

CROSS-REFERENCE TO RELATED APPLICATION

This disclosure is a continuation application of International Application No. PCT/CN2020/121857, filed on Oct. 19, 2020, which claims priority to and benefits of Chinese Patent Application No. 201911289524.6, filed on Dec. 13, 2019. For various purposes, the entire content of the aforementioned application is incorporated herein by reference.

TECHNICAL FIELD

The present disclosure relates to the field of computer vision technologies, and more particular, to a disparity determining method, an electronic device, and a computer-readable storage medium.

BACKGROUND

In the related art, computer vision technologies can be used to obtain the disparity between each pair of matching pixels in two images of different angle of views for the same scene, to obtain the disparity map, and obtain depth information of the scene based on the disparity map. Depth information can be used in various fields such as three-dimensional reconstruction, automated driving, and obstacle detection.

The methods described in this section are not necessarily methods that have been previously conceived or adopted. It should not be assumed that any of the methods described in this section are considered as prior art merely by virtue of their inclusion in this section, unless otherwise indicated. Similarly, the problem mentioned in this section should not be considered to be recognized in any prior art, unless otherwise indicated.

SUMMARY

According to an aspect of the present disclosure, a disparity determining method is provided. The method includes: downsampling a first image and a second image to obtain a first image with a first size and a second image with the first size; performing first-stage disparity computation on the first image with the first size and the second image with the first size to obtain a first disparity map with the first size; and performing second-stage disparity computation on a first image with a second size and a second image with the second size based on an upsampled disparity map with the second size, of the first disparity map, to obtain a second disparity map with the second size.

According to another aspect of the present disclosure, an electronic device is provided. The electronic device includes a processor; and a memory that stores a program, the program including instructions that, when executed by the processor, cause the processor to perform the method according to the present disclosure.

According to another aspect of the present disclosure, a computer-readable storage medium storing a program is provided, the program including instructions that, when executed by a processor of an electronic device, cause the electronic device to perform the method according to the present disclosure.

More features and advantages of the present disclosure will become apparent from exemplary embodiments described below with reference to the accompanying drawings.

BRIEF DESCRIPTION OF THE DRAWINGS

The drawings, which exemplarily illustrate embodiments and constitute a part of the specification, together with the text description of the specification, serve to explain exemplary implementations of the embodiments. The illustrated embodiments are for illustrative purposes only and do not limit the scope of the claims. Throughout the drawings, the same reference signs denote similar but not necessarily the same elements.

DETAILED DESCRIPTION

Figure 1:
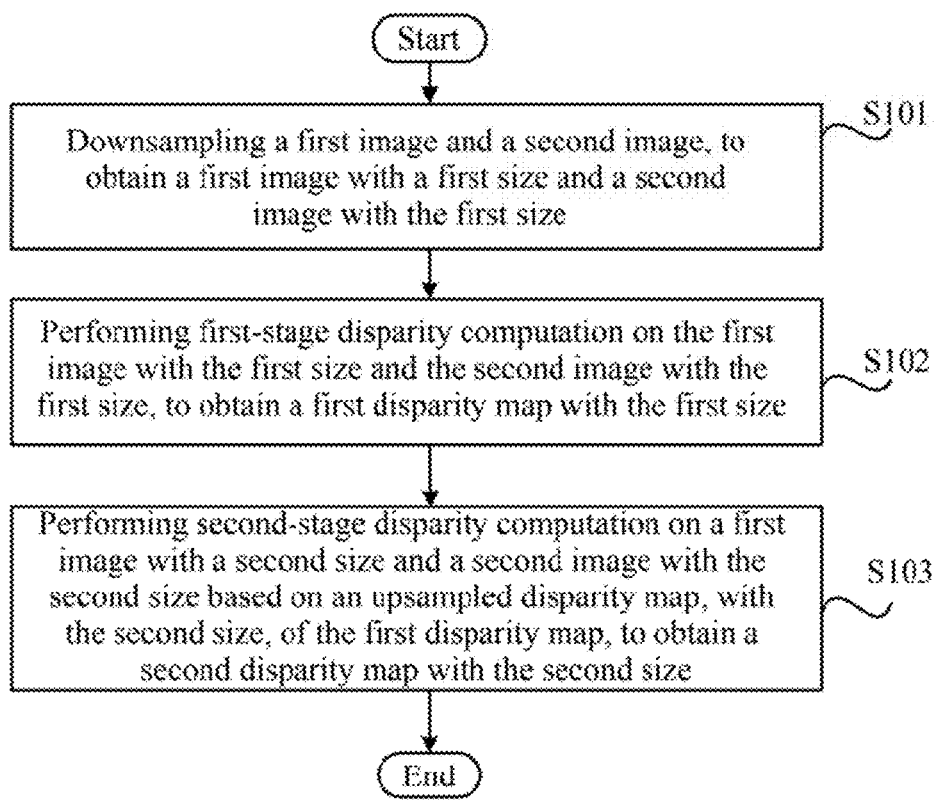
FIG. 1 is a flowchart illustrating a disparity determining method according to some exemplary embodiments of the present disclosure.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated. Moreover, the term "and/or" used in the present disclosure encompasses any of and all possible combinations of listed items.

In the related art, computer vision technologies can be used to obtain the disparity between each pair of matched pixels in two images of different angle of views for the same scene, to obtain the disparity map, and obtain depth information of the scene based on the disparity map. Depth information may be used in various fields such as three-dimensional reconstruction, automated driving, and obstacle detection. For example, methods for obtaining the disparity by using computer vision technologies may include local area-based matching methods, global optimization methods, semi-global methods, methods based on neural network such as convolutional neural network, etc.

For various disparity obtaining (or computing) methods, the disparity computation process may be considered as the process of searching for matching pixels, and the greater the real disparity between images is, the greater the range to be searched is. In addition, the disparity search range of the image and the size of the image will affect the speed of disparity computation. For example, the greater the size of the image and/or the disparity search range is, the greater the disparity computation amount is, and the lower the speed is. Therefore, in the related art, the image with a large size is downsampled first, and the disparity search range of the downsampled image is also decreased accordingly, and then disparity computation is performed based on the downsampled image, to obtain the desired disparity map. However, the disparity computed in this way will cause a loss in precision compared with the disparity computed directly based on the image with the original size, and the precision and running speed of the disparity computation cannot be both satisfied.

The present disclosure provides a disparity determining method, a first image and a second image is downsampled first to obtain a first image with a first size and a second image with the first size, and first-stage disparity computation is performed on the first image with the first size and the second image with the first size, to obtain a first disparity map with the first size; and then second-stage disparity computation is performed on a first image with a second size and a second image with the second size based on the upsampled disparity map with the second size of the first disparity map, to obtain a second disparity map with the second size. Since the first-stage disparity computation is based on the downsampled image, and the second-stage disparity computation is performed based on the first disparity map obtained by the first-stage disparity computation, thus the speed of the disparity computation can be increased, the precision requirement of the disparity computation can be satisfied, such that the speed and the precision of the disparity computation can be both satisfied. Exemplary embodiments of the disparity determining method of the present disclosure will be further described below with reference to the accompanying drawings.

FIG. 1 is a flowchart illustrating a disparity determining method according to some exemplary embodiments of the present disclosure. As shown in FIG. 1, the disparity determining method may include, for example: downsampling a first image and a second image, to obtain a first image with a first size and a second image with the first size (block S101); performing first-stage disparity computation on the first image with the first size and the second image with the first size, to obtain a first disparity map with the first size (block S102); and performing second-stage disparity computation on a first image with a second size and a second image with the second size based on an upsampled disparity map with the second size of the first disparity map, to obtain a second disparity map with the second size (block S103).

According to the disparity determining method shown in FIG. 1, the first image and the second image are downsampled first to obtain the first image with the first size and the second image with the first size, and first-stage disparity computation is performed on the first image with the first size and the second image with the first size to obtain the first disparity map with the first size, and then second-stage disparity computation is performed on the first image with the second size and the second image with the second size based on the upsampled disparity map with the second size of the first disparity map, to obtain the second disparity map with the second size. Since the first-stage disparity computation is based on the downsampled image, and the second-stage disparity computation is performed based on the first disparity map obtained by the first-stage disparity computation, thus the speed of the disparity computation can be increased, the precision requirement of the disparity computation can be satisfied, such that the speed and the precision of the disparity computation can be both satisfied.

According to some embodiments, the first image and the second image may be images for the same scene captured by a multiocular camera. The first image and the second image may have the same size, but have different angle of views. Certainly, the first image and the second image may also be images meeting requirements and obtained in other manners (for example, obtained from other third-party devices). In addition, the first image and the second image may be grayscale images or color images.

According to some embodiments, the first image and the second image may be epipolar rectified, and have the disparity in a direction (for example, in the horizontal direction or vertical direction). In other words, before the first image and the second image are downsampled, the method may further include: performing epipolar rectification on the first image and the second image, such that the first image and the second image have the disparity in one direction. Thereby, the disparity search range of the image can be limited to one direction, such that the efficiency of disparity computation can be improved. As an alternative, the epipolar rectification operation of the image may be performed by the multiocular camera or other third-party devices.

In the present disclosure, the multiocular camera refers to the camera configured with two, three, or even more camera lenses and capable of performing static or dynamic image photographing, it can cover scenes of different angle of views or ranges through the configured multiple lenses, so as to enhance its capability for detecting objects in the scene. Taking a binocular camera configured with two lenses (e.g., a left lens and a right lens) as an example, for any scene, the binocular camera can capture, through the configured two lenses, two images (e.g., a left-view image and a right-view image) of the scene with the same size and different photographing angles. The two images can be configured to determine displacement (for example, horizontal displacement), i.e., disparity, of objects in the scene between corresponding pixels in the two images, so as to determine depth information such as the distance of the object.

In the present disclosure, the size of each image (including the first image, the second image, and disparity maps such as the first disparity map and the second disparity map) may refer to the size of a single channel of each image, which may be represented by the height and width of the image, for example, may be expressed as H×w, where H represents the height of the image, and W represents the width of the image, both of which may be measured in pixels. Certainly, this is merely an example, and the size of the image may also be represented by one or more parameters that can reflect the number of pixels, the data volume, the storage capacity, or definition of the image. In addition, it should be noted that for a grayscale image, its number of channels is 1, and for a color image that may have three color channels of R, G, and B, its number of channels may be 3, that is, the actual size of the color image may be expressed as H×W×3. In addition, in the present disclosure, the size of the first image and the second image (i.e., the size of the original image that has not been downsampled and/or upsampled) may be determined based on parameters such as the size and the number of pixels of the sensor of the multiocular camera for capturing the first image and the second image.

According to some embodiments, downsampling the first image and the second image to obtain the first image with the first size and the second image with the first size may include: determining a threshold of times of disparity computation; determining, based on the threshold of times, a downsampling factor required for downsampling the first image and the second image; and downsampling the first image and the second image based on the downsampling factor. The greater the threshold of times is, the greater the downsampling factor is.

According to some embodiments, the threshold of times may be flexibly set according to actual needs. For example, according to actual needs, the threshold of times may be set to 2, 3, 4, or other positive integers not less than 2. In addition, the threshold of times may not be the greater the better, and it may be an appropriate value selected on the premise of balancing the precision requirement of the target device and the running speed of disparity computation.

According to some embodiments, the process of downsampling may be the following acts. For example, for an image with a size of H×w, in the case that the downsampling factor is P, a point may be selected every P points in each row and each column of the original image to form an image. Certainly, this is merely an example, and downsampling may also be implemented in another manner, for example, by averaging the P points. In other words, when the image is downsampled by using the downsampling factor P, the height and width of the downsampled image may be 1/P times the height and width of the original image, respectively.

According to some embodiments, as an example, the threshold of times is represented as N, and the upsampling step or the downsampling step between images on which each two adjacent stages of disparity computation are based is consistent, and then the downsampling factor P may be expressed as K to the power of N−1, where K is the upsampling step or the downsampling step between the images on which two adjacent stages of disparity computation are based, and K may be any value not less than 1. For example, K may be 2, 3, 4, or other positive integers not less than 1, or any non-integer not less than 1. In addition, it should be noted that the downsampling factor P herein refers to the sampling factor accumulated by multi-stage (including two stages) disparity computation, and the upsampling step K or downsampling step K herein refers to the sampling factor between the images on which two adjacent stages of disparity computation are based. In addition, similar to the foregoing description, when the upsampling step or the downsampling step between the images on which two adjacent stages of disparity computation are based is K, and a high stage of disparity computation requires a large size of the image, the height and width of the image on which next-stage disparity computation is based may be respectively K times the height and width of the image on which current-stage disparity computation is based.

For example, when the threshold N of times is 2, and the upsampling step or downsampling step K between the images on which two adjacent stages of disparity computation are based is 2, the downsampling factor may be expressed as $2^1$. Accordingly, when the original size of the first image and the second image is expressed as H×W (which may be called full size), and then the size (i.e., the first size) of the obtained first image with the first size and the obtained second image with the first size (i.e., the images on which the first-stage disparity computation is based) may be expressed as $$\frac{H}{2} \times \frac{W}{2}$$

(which may be called ½ size), after the first image and the second image are downsampled based on the downsampling factor. In addition, in this case, the size (i.e., the second size) of the image on which the second-stage disparity computation is based may be correspondingly expressed as H×w (i.e., the full size).

For another example, when the threshold N of times is 3, and the upsampling step or downsampling step K between the images on which two adjacent stages of disparity computation are based is 2, the downsampling factor may be expressed as $2^2$. Accordingly, when the original size of the first image and the second image is expressed as H×W (i.e., the full size), and then the size (i.e., the first size) of the obtained first image with the first size and the obtained second image with the first size (i.e., the images on which the first-stage disparity computation is based) may be expressed as $$\frac{H}{4} \times \frac{W}{4}$$

(which may be called ¼ size), after the first image and the second image are downsampled based on the downsampling factor. In addition, in this case, the size (i.e., the second size) of the image on which the second-stage disparity computation is based may be correspondingly expressed as $$\frac{H}{2} \times \frac{W}{2}$$

(i.e., the ½ size).

In other words, the first image with the second size on which the second-stage disparity computation is based can be the first image itself (e.g. when the threshold of times of disparity computation is 2) or can be a downsampled image of the first image (e.g. when the threshold of times of disparity computation is greater than 2), and the second image with the second size on which the second-stage disparity computation is based can be the second image itself (e.g. when the threshold of times of disparity computation is 2) or can be a downsampled image of the second image (e.g. when the threshold of times of disparity computation is greater than 2).

It should be noted that, in the present disclosure, the upsampling step (or the downsampling step) between images on which each two adjacent stages of disparity computation are based may be inconsistent, and may be flexibly adjusted according to actual needs. For example, when the value of N is 4, the upsampling step between images on which the first-stage disparity computation and the second-stage disparity computation are based may be set to a first value, the upsampling step between images on which the second-stage disparity computation and third-stage disparity computation are based may be set to a second value, and the upsampling step between images on which the third-stage disparity computation and fourth-stage disparity computation are based may be set to a third value. The second value may be different from the first value (certainly, as mentioned above, the second value may also be the same as the first value), and the third value may be different from the first value or the second value (certainly, as mentioned above, the third value may also be the same as the first value or the second value). In addition, the first value, the second value, and the third value each may be a value not less than 1.

In addition, after the image is downsampled, the disparity search range corresponding to the image will be decreased accordingly. For example, the disparity search range corresponding to the first image and the second image is expressed as [0, D], where D represents the maximum disparity search value, and its value may be related to focal lengths of the camera lenses and/or distances between the camera lenses in the multiocular camera for capturing the first image and the second image (similar to the height H and the width W of the image, D may be measured in pixels), and when the size of the first image and the second image obtained by downsampling the first image and the second image based on the downsampling factor is $$\frac{H}{2} \times \frac{W}{2},$$

the disparity search range of the downsampled first image and the downsampled second image may be decreased to $$\left[0, \frac{D}{2}\right].$$

In this way, the computation amount required for the first-stage disparity computation on the downsampled first image and the downsampled second image (i.e., the first image with the first size and the second image with the first size) can be correspondingly reduced to 1/8 of that required for disparity computation based on the image with the full size (the computation amount required for disparity computation on each image is related to the product of the height, the width, and the maximum disparity search value of the image), such that the computation amount required for disparity computation can be greatly reduced, and the initial disparity can be quickly obtained. In addition, after the initial disparity is obtained, the second-stage disparity computation may be performed on the first image and the second image with a large size such as the second size based on the initial disparity, so as to obtain the disparity map with high precision. Since the second-stage disparity computation is performed based on the initial disparity, the required computation amount is relatively low, thereby improving precision and ensuring the computation speed.

According to some embodiments, after second-stage disparity computation is performed on the first image with the second size and the second image with the second size based on the upsampled disparity map with the second size of the first disparity map to obtain the second disparity map with the second size, the method may further include: in response to the number of times of disparity computation reaching the threshold of times, taking the second disparity map with the second size as the final disparity map between the first image and the second image.

According to other embodiments, the method may further include: in response to the number of times of disparity computation not reaching the threshold of times, cyclically performing the operation of performing next-stage disparity computation on the first image with the size corresponding to the next-stage disparity computation and the second image with the size corresponding to the next-stage disparity computation based on the upsampled disparity map, with the size corresponding to the next-stage disparity computation, of the disparity map obtained by current-stage disparity computation, until it is determined that the number of times of disparity computation reaches the threshold of times; and taking the disparity map obtained by last-stage disparity computation as the final disparity map between the first image and the second image. The size corresponding to each stage of disparity computation is the size of the image on which this stage of disparity computation is based (or may be considered as the size of the disparity map that needs to be obtained by this stage of disparity computation). In addition, the upsampling method adopted to obtain the corresponding upsampled disparity map may include, for example, a nearest-neighbor interpolation algorithm, a bilinear interpolation algorithm, or a deconvolution algorithm, etc.

Therefore, by the cascaded multiple-stage disparity computation, the precision of the finally obtained disparity map can be further improved. In addition, since each next-stage disparity computation is performed on the basis of the disparity map obtained by its immediate previous stage of disparity computation, the computation amount is relatively low, and the requirement for the running speed of disparity computation can be met.

Figure 2:
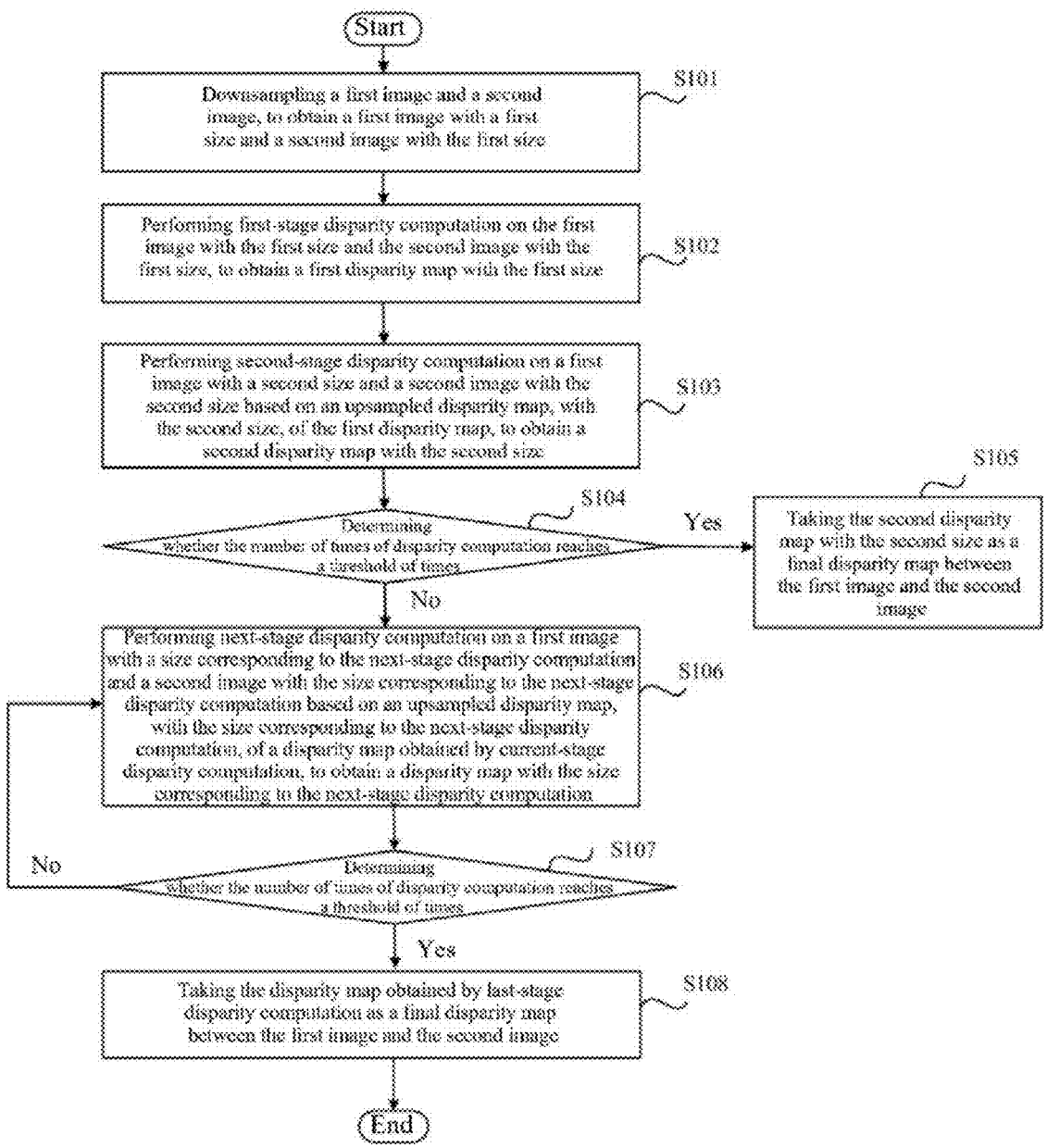
FIG. 2 is a flowchart illustrating a disparity determining method according to some other exemplary embodiments of the present disclosure.

For example, FIG. 2 is a flowchart illustrating a disparity determining method according to some other exemplary embodiments of the present disclosure. As shown in FIG. 2, in addition to block S101, block S102, and block S103 that are the same as those shown in FIG. 1, the disparity determining method may further include the following acts.

At block S104, it is determined whether the number of times of disparity computation reaches the threshold of times; and if yes, block S105 is executed, and otherwise, block S106 is executed.

As mentioned above, the threshold of times may be set according to actual needs. For example, the threshold of times may be set to 2, 3, 4, or other suitable positive integers not less than 2, on the premise of balancing the precision requirement of the target device and the running speed of disparity computation.

At block S105, the second disparity map with the second size is taken as the final disparity map between the first image and the second image.

At block S106, next-stage disparity computation is performed on a first image with a size corresponding to the next-stage disparity computation and a second image with the size corresponding to the next-stage disparity computation based on an upsampled disparity map, with the size corresponding to the next-stage disparity computation, of a disparity map obtained by current-stage disparity computation, to obtain the disparity map with the size corresponding to the next-stage disparity computation.

For example, the current-stage disparity computation is the second-stage disparity computation, the size corresponding to the next-stage disparity computation (i.e., third-stage disparity computation) is represented as a third size, and then in this case, block S106 may be correspondingly expressed as: performing third-stage disparity computation on the first image with the third size and the second image with the third size based on the upsampled disparity map, with the third size, of the second disparity map, to obtain the third disparity map with the third size.

At block S107, it is determined whether the number of times of disparity computation reaches the threshold of times, and if yes, block S108 is executed, and otherwise, block S106 is executed.

At block S108, the disparity map obtained in block S106 with the size corresponding to the next-stage disparity computation (i.e., the disparity map obtained by last-stage disparity computation) is taken as the final disparity map between the first image and the second image.

According to some embodiments, in addition to outputting the disparity map obtained by the last-stage disparity computation as the final disparity map between the first image and the second image, the disparity maps obtained by other stages of disparity computation may also be output, so as to obtain multiple disparity maps with different sizes (for example, these different sizes may be increased in an order from low to high in accordance with the corresponding stages of disparity computation), for use by multiple target devices with different performance or different precision requirements. Thereby, the precision and speed requirements of the different target devices can be met, and the flexibility and applicability of the system can be improved. In addition, the disparity maps obtained by various stages of disparity computation may be stored (for example, cached) in a storage device or a storage medium for subsequent reading and use.

According to some embodiments, the size of the disparity map obtained by the last-stage disparity computation in respective stages of disparity computation may be consistent with the original size of the first image and the second image. In other words, with the disparity determining method according to embodiments of the present disclosure, the disparity map with the corresponding size consistent with the original size of the first image and the second image and with relatively high precision can be obtained, such that the requirement of the high-performance target device for precision of the generated disparity map can be met. As an alternative, the size of the disparity map obtained by the last-stage disparity computation may also be less than the original size of the first image and the second image, and may be flexibly set according to actual needs.

In the present disclosure, each stage of disparity computation can be implemented by using the disparity computation method such as the local area-based matching (i.e., local stereo matching) method or the method based on the neural network. In addition, each stage of disparity computation may include acts of: determining the image feature related to the first image and the image feature related to the second image on which this stage of disparity computation is based; determining the disparity search range corresponding to this stage of disparity computation; and performing disparity computation based on the image feature related to the first image and the image feature related to the second image on which this stage of disparity computation is based, and the disparity search range corresponding to this stage of disparity computation.

It should be noted that, since each stage of disparity computation other than the first-stage disparity computation is performed on the basis of the disparity map (e.g., the upsampled disparity map of the disparity map) obtained by the immediate-previous-stage disparity computation, the processing manner thereof may be different from the first-stage disparity computation. Taking the second-stage disparity computation as an example, the processing process of each stage of disparity computation other than the first-stage disparity computation will be described below with reference to FIG. 3 and FIG. 4.

Figure 3:
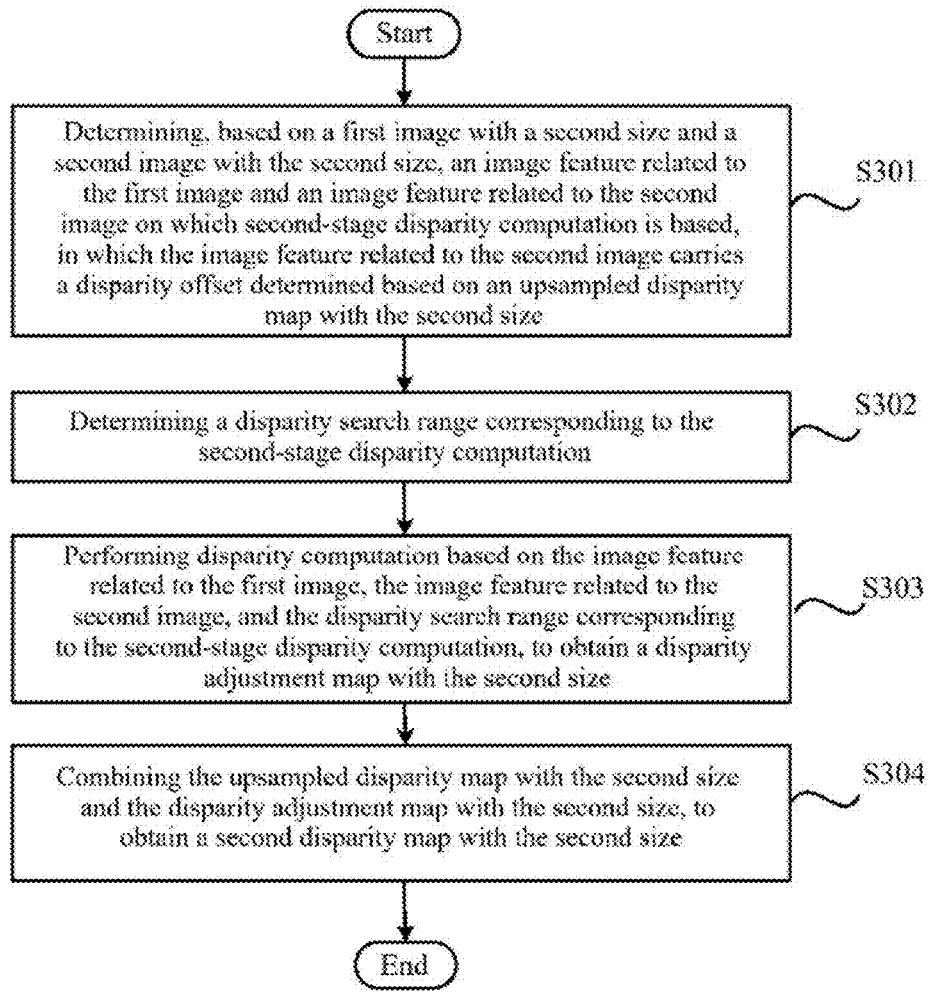
FIG. 3 is a flowchart illustrating second-stage disparity computation according to some exemplary embodiments of the present disclosure.

According to some embodiments, as shown in FIG. 3, FIG. 3 is a flowchart illustrating second-stage disparity computation according to some exemplary embodiments of the present disclosure, performing second-stage disparity computation on the first image with the second size and the second image with the second size based on the upsampled disparity map with the second size of the first disparity map to obtain the second disparity map with the second size may include the following blocks S301 to S304.

At block S301, the image feature related to the first image and the image feature related to the second image on which the second-stage disparity computation is based are determined, in which the image feature related to the second image carries a disparity offset determined based on the upsampled disparity map with the second size, based on the first image with the second size and the second image with the second size.

For example, when it is determined, based on the upsampled disparity map with the second size, that the initial disparity of a point p in the first image $I_1$ with the second size is disp1(p), the disparity offset value represented by the initial disparity disp1(p) can be added when the image feature related to the second image is determined. In addition, in disparity computation, one image (for example, the first image) of the first image and the second image is the reference image, and the other image (for example, the second image) is the image to be matched (i.e., the target image), and thus the corresponding disparity offset may be carried merely in the image feature related to the target image (for example, the second image). In the present disclosure, the first image is taken as the reference image and the second image as the target image for illustration. According to actual needs, the second image may be taken as the reference image, and the first image is taken as the target image. In this case, the corresponding disparity offset may be carried in the image feature related to the first image.

At block S302, the disparity search range corresponding to the second-stage disparity computation is determined.

At block S303, disparity computation is performed based on the image feature related to the first image, the image feature related to the second image, and the disparity search range corresponding to the second-stage disparity computation, to obtain the disparity adjustment map with the second size.

At block S304, the upsampled disparity map with the second size and the disparity adjustment map with the second size is combined (e.g., added), to obtain the second disparity map with the second size.

It can be learned from the foregoing steps that, when the image feature related to the first image and the image feature related to the second image on which the second-stage disparity computation is based are determined, the corresponding disparity offset may be carried in the image feature related to the second image (i.e., the target image). The disparity offset may be determined based on the upsampled disparity map with the second size. For example, the disparity value in the upsampled disparity map with the second size may be directly taken as the disparity offset. In this way, the disparity map with a high precision can be quickly obtained based on the disparity map obtained by the immediate-previous-stage disparity computation.

According to some embodiments, with respect to the conventional manner in the related art, the disparity search range corresponding to the second-stage disparity computation may be set to a small range, such that efficiency of secondary disparity search on the image with a large size can be improved, and the speed and precision requirements can be better satisfied.

For example, based on the upsampling step between the first disparity map and the upsampled disparity map with the second size, and the maximum disparity error corresponding to the first-stage disparity computation, the disparity search range corresponding to the second-stage disparity computation may be set to where $[-D_0, D_0]$, $D_0$ may be a positive value not greater than $M_0(K-1)$, and as described in the foregoing related embodiments, K may represent the upsampling step and can be a value not less than 1, and $M_0$ may represent the maximum disparity error corresponding to the first-stage disparity computation, and can be a value not less than 1. In addition, the value of $M_0$ may be determined based on device parameters (for example, focal lengths of the camera lenses, and/or distances between the camera lenses in the multiocular camera) of the multiocular camera for capturing the first image and the second image and the size of the image on which the first-stage disparity computation is based (or the ratio of the size of the image on which the first-stage disparity computation is based to the original size of the first image or the second image). As an example, the focal length of respective camera lenses in the multiocular camera is 1200 (which may be measured in millimeters), and the baseline (the distance between optical centers of two camera lenses, i.e., the distance between the two camera lenses) is 50 (which may be measured in millimeters), and when an object beyond 30 cm is captured, the maximum disparity error corresponding to the full size may be 200. When N=2 and K=2, the value of the maximum disparity error $M_0$ corresponding to the first-stage disparity computation may be 100. In addition, it should be noted that, since the maximum disparity errors corresponding to respective stages of disparity computation may be different, the disparity search ranges corresponding to respective non-first-stage disparity computation (including the second-stage disparity computation) may also be different.

As an example, the value of K is 2, the disparity search range corresponding to the second-stage disparity computation may be set to $[-1, 1]$ at the minimum, and does not need to be very large at the maximum, such that the computation amount required for the second-stage disparity computation can be significantly reduced, thereby greatly increasing the speed of disparity computation.

Thereby, compared with directly using the image with the full size to compute the disparity, the computation amount required for the second-stage disparity computation may be $$\frac{2 \cdot D_0 + 1}{D}$$

of that required when the disparity is computed by directly using the image with the full size, and the computation amount is relatively low. For example, when the total number of times of disparity computation is 2, and the value of the upsampling step or the downsampling step between the images on which two adjacent stages of disparity computation are based is 2, the total computation amount required for disparity computation may be $$\frac{1}{8} + \frac{2 \cdot D_0 + 1}{D}$$

of that required when the disparity is computed by directly using the image with the full size, the computation amount is significantly reduced, such that the speed of disparity computation can be greatly increased.

In addition, it can be concluded that, when the total number of times of disparity computation is 3, and the value of the upsampling step or the downsampling step between the images on which two adjacent stages of disparity computation are based is 2, the total computation amount may be $$\frac{1}{64} + \frac{2D_1 + 1}{4D} + \frac{2D_0 + 1}{D}$$

of that required when the disparity is computed by directly using the image with the full size, where $D_1$ and $D_0$ may be the upper limit of the disparity search range corresponding to the second-stage disparity computation and the third-stage disparity computation, respectively. Similarly, when the total number of times of disparity computation is n+1, the total computation amount may be $$\frac{1}{2^{3n}} + \sum_{i=n-1}^{0} \frac{2D_i + 1}{2^{2i}D},$$

n≥1 of that required when the disparity is computed by directly using the image with the full size.

Figure 4:
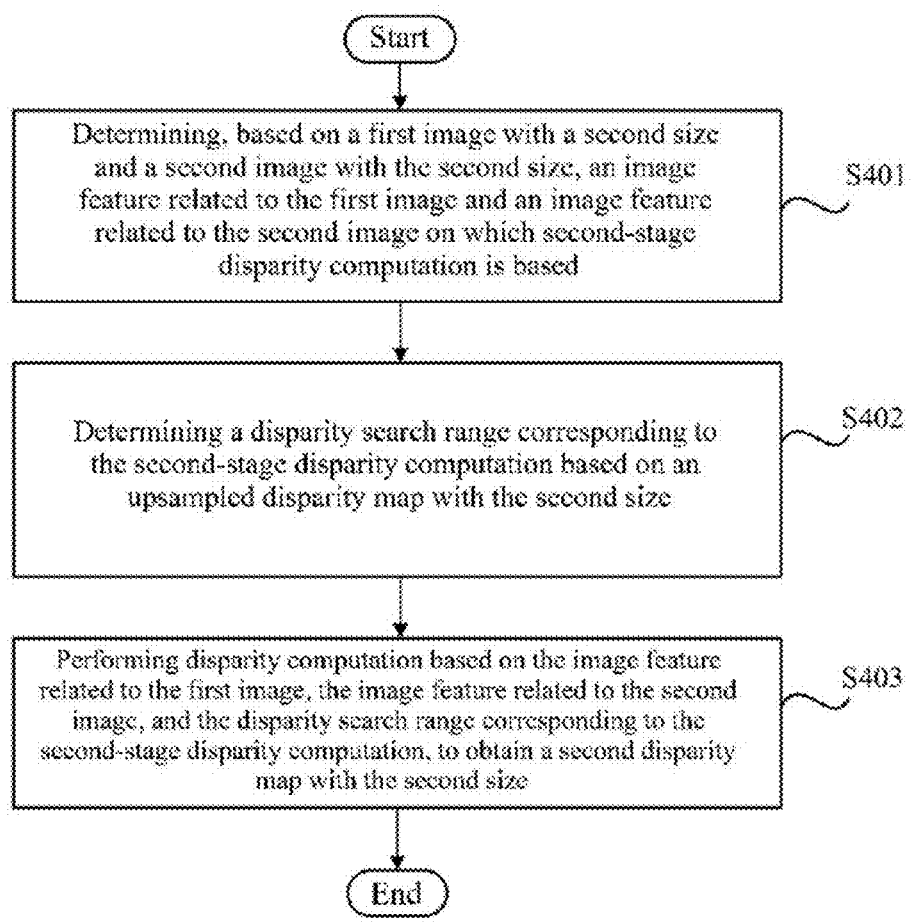
FIG. 4 is a flowchart illustrating second-stage disparity computation according to some other exemplary embodiments of the present disclosure.

As an alternative, as shown in FIG. 4, FIG. 4 is a flowchart illustrating second-stage disparity computation according to some other exemplary embodiments of the present disclosure, performing second-stage disparity computation on the first image with the second size and the second image with the second size based on the upsampled disparity map with the second size of the first disparity map to obtain the second disparity map with the second size may include the following blocks S401 to S403.

At block S401, the image feature related to the first image and the image feature related to the second image on which the second-stage disparity computation is based are determined, based on the first image with the second size and the second image with the second size.

At block S402, disparity search range corresponding to the second-stage disparity computation is determined based on the upsampled disparity map with the second size.

In other words, the disparity search range corresponding to the second-stage disparity computation carries the disparity offset determined based on the upsampled disparity map with the second size.

At block S403, disparity computation is performed based on the image feature related to the first image, the image feature related to the second image, and the disparity search range corresponding to the second-stage disparity computation, to obtain the second disparity map with the second size.

It can be learned from the steps that, in addition to the manner shown in FIG. 3 in which the corresponding disparity offset is carried in the image feature related to the first image or the image feature related to the second image on which the second-stage disparity computation is based, the corresponding disparity offset may also be carried in the disparity search range corresponding to the second-stage disparity computation. In this way, the disparity map with a high precision can be quickly obtained based on the disparity map obtained by the immediate-previous-stage disparity computation.

According to some embodiments, the block S402 of determining the disparity search range corresponding to the second-stage disparity computation based on the upsampled disparity map with the second size may include: determining a disparity search adjustment range corresponding to the second-stage disparity computation based on the upsampling step between the first disparity map and the upsampled disparity map with the second size and the maximum disparity error corresponding to the first-stage disparity computation; and adjusting the disparity search adjustment range corresponding to the second-stage disparity computation by using the disparity value in the upsampled disparity map with the second size as a reference, to obtain the disparity search range corresponding to the second-stage disparity computation and carrying a corresponding disparity offset.

According to some embodiments, similar to the manner of setting the disparity search range corresponding to the second-stage disparity computation in the foregoing embodiments, the disparity search adjustment range corresponding to the second-stage disparity computation may also be set to a small range. Correspondingly, the disparity search range corresponding to the second-stage disparity computation and carrying the corresponding disparity offset may also be a small range, so as to improve efficiency of secondary disparity search on the image with a large size, and better satisfy the speed and precision requirements.

For example, the disparity search adjustment range corresponding to the second-stage disparity computation may be set to $[-D_0, D_0]$, based on the upsampling step between the first disparity map and the upsampled disparity map with the second size, and the maximum disparity error corresponding to the first-stage disparity computation. The disparity search range corresponding to the second-stage disparity computation and carrying the corresponding disparity offset may be expressed as $[-D_0+disp1, D_0+disp1]$, where disp1 represents the disparity value in the upsampled disparity map with the second size, and $D_0$ is a positive value not greater than $M_0(K-1)$, where K may represent the upsampling step and is a value not less than 1, and $M_0$ may represent the maximum disparity error corresponding to the first-stage disparity computation and is a value not less than 1. In addition, similar to the related descriptions in the foregoing embodiment, the value of $M_0$ may be determined based on device parameters (for example, focal lengths of the camera lenses and/or distances between the camera lenses in the multiocular camera) of the multiocular camera for capturing the first image and the second image and the size of the image on which the first-stage disparity computation is based (or the ratio of the size of the image on which the first-stage disparity computation is based to the original size of the first image or the second image). In addition, it should be noted that, since the maximum disparity errors corresponding to respective stages of disparity computation may be different, the disparity search adjustment ranges corresponding to respective non-first-stage disparity computation including the second-stage disparity computation and the corresponding disparity adjustment range carrying the disparity offset may also be different.

For example, when it is determined, based on the upsampled disparity map with the second size, that the initial disparity of a point p in the first image $I_i$ with the second size is disp1(p), and then the disparity search range corresponding to the point p in the first image $I_1$, related to the second-stage disparity computation and carrying the corresponding disparity offset may be expressed as $[-D_0+disp1(p), D_0+disp1(p)]$.

In addition, as an example, the value of K is 2, the disparity search adjustment range corresponding to the second-stage disparity computation may be set to $[-1, 1]$ at the minimum, and does not need to be very large at the maximum, such that the computation amount required for the second-stage disparity computation can be significantly reduced, thereby greatly increasing the speed of disparity computation.

As can be seen from the foregoing descriptions related to FIG. 3 and FIG. 4, each stage of disparity computation other than the first-stage disparity computation, including the second-stage disparity computation, can be implemented in the following two manners.

In the first manner, the following acts may be included: determining the image feature related to the first image and the image feature related to the second image on which this stage of disparity computation is based, based on the first image with the size corresponding to this stage of disparity computation and the second image with the size corresponding to this stage of disparity computation, in which the image feature related to the second image carries the disparity offset determined based on the upsampled disparity map, with the size corresponding to this stage of disparity computation, of the disparity map obtained by the immediate-previous-stage disparity computation; determining the disparity search range corresponding to this stage of disparity computation, and performing disparity computation based on the image feature related to the first image and the image feature related to the second image on which this stage of disparity computation is based, and the disparity search range corresponding to this stage of disparity computation, to obtain the disparity adjustment map with the size corresponding to this stage of disparity computation; and combining (e.g., adding) the upsampled disparity map with the size corresponding to this stage of disparity computation and the disparity adjustment map with the size corresponding to this stage of disparity computation, to obtain the disparity map with the size corresponding to this stage of disparity computation.

In the second manner, the following acts may be included: determining the image feature related to the first image and the image feature related to the second image on which this stage of disparity computation is based, based on the first image with the size corresponding to this stage of disparity computation and the second image with the size corresponding to this stage of disparity computation; determining a disparity search range corresponding to this stage of disparity computation based on the upsampled disparity map, with the size corresponding to this stage of disparity computation, of the disparity map obtained by the immediate-previous-stage disparity computation (i.e., the disparity search range corresponding to this stage of disparity computation carries the disparity offset determined based on the upsampled disparity map with the size corresponding to this stage of disparity computation); and performing disparity computation based on the image feature related to the first image and the image feature related to the second image on which this stage of disparity computation is based, and the disparity search range corresponding to this stage of disparity computation, to obtain the disparity map with the size corresponding to this stage of disparity computation.

In other words, in addition to the manner in which the corresponding disparity offset may be carried in the image feature related to the second image (i.e., the target image) on which this stage of disparity computation is based, the corresponding disparity offset may also be carried in the disparity search range corresponding to this stage of disparity computation. In this way, the disparity map with a high precision can be quickly obtained based on the disparity map obtained by the immediate-previous-stage disparity computation. In addition, it should be noted that, the disparity search ranges corresponding to the foregoing various non-first-stage disparity computation may be set in the manner described in the foregoing related embodiments, and details are not be repeated.

According to some embodiments, for various stages of disparity computation including the first-stage and second-stage disparity computation, the image feature related to the first image or the image feature related to the second image may include: at least one of RGB components of each pixel and a gradient (e.g., a horizontal gradient or a vertical gradient) of each pixel in the image.

According to some embodiments, $p_1(x, y)$ and $p_2(x-1,y)$ are denoted as two adjacent points in the first image $I_1$ with the corresponding size, and then the horizontal gradient of the point $p_1$ in the first image $I_1$ may be expressed as $$\nabla_x(I_1(p_1)) = \frac{I_1^r(p_1) + I_1^g(p_1) + I_1^b(p_1)}{3} - \frac{I_1^r(p_2) + I_1^g(p_2) + I_1^b(p_2)}{3},$$

where $I_1^r(p_1)$, $I_1^g(p_1)$, and $I_1^b(p_1)$ may represent the R, G, and B components of the $p_1$ point in the first image $I_1$, respectively, and $I_1^r(p_2)$, $I_1^g(p_2)$, and $I_1^b(p_2)$ may represent the R, G, and B components of the point $p_2$ in the first image $I_1$, respectively. In addition, the RGB components of each pixel in the image can be directly read from the image by various RGB component reading algorithms in the related art, without additional computing operations.

According to some embodiments, in addition to including the RGB components and/or the gradient of the pixel, the image feature related to the first image or the image feature related to the second image may also be flexibly set according to actual situations, for example, it may also be set that the image feature related to the first image or the image feature related to the second image includes pixel values of the first image and the second image, the squared difference (squared difference) between matching pixels in the first image and the second image, the cross-correlation value of the first image and the second image, the Hamming distance between matching pixels of the first image and the second image, and even high-level image features, such as one or more of the semantic feature, the edge feature, the texture feature, or the shape feature, etc., of the first image and the second image relative to the above-mentioned low-complexity features (that is, the features that can be obtained by relatively simple conversion based on the pixel values or the RGB components, etc. in the image), so as to improve flexibility and diversity of image feature selection.

According to some embodiments, the weight of each image feature in each stage of disparity computation may be flexibly set according to actual situations. As an example, the image feature related to the first image or the image feature related to the second image includes RGB components and/or gradients of pixels, and the weight of the RGB components of each pixel in each stage of disparity computation may be set to be not less than the weight of the gradient of each pixel in each stage of disparity computation. As an alternative, considering that the gradient of the pixels reflects the difference between adjacent pixels, which is relatively constant, the weight of the RGB components of each pixel in each stage of disparity computation may alternatively be set to be not greater than the weight of the gradient of each pixel in each stage of disparity computation, which is not limited.

In the present disclosure, as described above, each stage of disparity computation can be implemented by using the disparity computation method such as the local area-based matching (namely, local stereo matching) method or the method based on the neural network. According to some embodiments, disparity computation using the local area-based matching method can be implemented by constructing a cost volume, and disparity computation using the method based on the neural network can be implemented by selecting an appropriate neural network.

The foregoing two implementations of the second-stage disparity computation shown in FIG. 3 and FIG. 4 are taken as an example below to describe the processing process, in the second-stage disparity computation, of performing disparity computation based on the image features related to the first and second images and the corresponding disparity search range, to obtain the disparity adjustment map with the second size (corresponding to block S303) or the second disparity map with the second size (corresponding to block S403). It should be noted that, the processing processes, in other stages of disparity computation (including the first-stage disparity computation), of performing disparity computation based on the image features related to the first and second images and corresponding disparity search ranges to obtain the disparity adjustment map or the disparity map with the corresponding size is similar to the above corresponding process in the second-stage disparity computation, and the difference lies in that for the first-stage disparity computation, the image feature related to the target image on which the first-stage disparity computation is based or the disparity search range does not carry the corresponding disparity offset, and the details are not be described again.

According to some embodiments, block S303 of performing disparity computation based on the image feature related to the first image, the image feature related to the second image, and the disparity search range corresponding to the second-stage disparity computation, to obtain the disparity adjustment map with the second size may include: constructing a cost volume based on the image feature related to the first image, the image feature related to the second image, and the disparity search range corresponding to the second-stage disparity computation; and determining the disparity adjustment value between each pair of matching pixels in the first image with the second size and the second image with the second size based on the cost volume, to obtain the disparity adjustment map with the second size.

The size of the cost volume may be related to the size (namely, the second size) of the image on which the second-stage disparity computation is based and the disparity search range corresponding to the second-stage disparity computation. In addition, a point $C(p, d)$ (that is, the matching cost $C(p, d)$ of a point $p(x, y)$ at the disparity d in the first image $I_1$ with the corresponding size (namely, the second size)) in the cost volume may be used to represent a difference between the point p(x, y) in the first image $I_1$ with the corresponding size and a point q(x−d−disp1(p), y) in the second image $I_2$ with the corresponding size (namely, the second size). The value range of d may be determined according to the disparity search range corresponding to the second-stage disparity computation. For example, when the disparity search range corresponding to the second-stage disparity computation is expressed as $[-D_0, D_0]$, the value range of d may be expressed as $[-D_0, D_0]$, and disp1(p) may represent the initial disparity, determined based on the upsampled disparity map with the corresponding size (namely, the second size), of a point p in the first image $I_1$ with the corresponding size.

According to some embodiments, as an example, when the determined image feature related to the first image or the determined image feature related to the second image includes the RGB components of each pixel and the gradient (for example, the horizontal gradient) of each pixel in the image, the difference may correspondingly include a color difference and a gradient difference.

According to some embodiments, the color difference may be expressed as $$M(p, d) = \sum_{i=1}^{3} |I_1^i(p) - I_2^i(q)|,$$

where the three values 1, 2, and 3 of i may represent the R, G, and B components, respectively. The gradient difference (for example, a horizontal gradient difference) may be expressed as $G(p, d) = |\nabla_x(I_1(p)) - \nabla_x(I_2(q))|$, where $\nabla_x(I_1(p))$ may represent the horizontal gradient of the point p in the first image $I_1$ with the corresponding size (namely, the second size), and $\nabla_x(I_2(q))$ may represent the horizontal gradient of the point q in the second image $I_2$ with the corresponding size (namely, the second size).

According to some embodiments, the point C(p, d) in the cost volume may be expressed by the formula: $C(p, d) = \alpha \cdot \min(T_c, M(p, d)) + (1-\alpha) \cdot \min(T_g, G(p, d))$, where α is the weight that can be used to balance a color term and a gradient term, $T_c$ and $T_g$ may respectively represent truncated values related to the color term and the gradient term, and values of the three can be flexibly set according to actual situations. For example, it can be set that α=0.9, Tc=21, and Tg=4, which not limited herein.

According to some embodiments, determining the disparity adjustment value between each pair of matching pixels in the first image with the second size and the second image with the second size based on the cost volume may include: performing cost aggregation (that is, cost filtering) on matching costs in the cost volume based on the aggregation window corresponding to the second-stage disparity computation; determining a minimum cumulative cost of each pixel in the first image (that is, the reference image) with the second size within the disparity search range corresponding to the second-stage disparity computation, based on a result of the cost aggregation; and determining the disparity adjustment value between each pixel in the first image with the second size and each matching pixel in the second image (that is, the target image) with the second size based on the minimum cumulative cost, based on the minimum cumulative cost.

In other words, after the cost volume is constructed, the cost aggregation may be performed on the matching costs in the cost volume based on the corresponding aggregation window, so as to eliminate single-point noise and improve matching precision. Then, the corresponding disparity adjustment value can be determined by taking the minimum value of the aggregated matching costs (that is, cumulative costs).

According to some embodiments, performing cost aggregation on matching costs in the cost volume based on the aggregation window corresponding to the second-stage disparity computation may include: performing cost aggregation on matching costs corresponding to the same disparity in the cost volume based on the aggregation window corresponding to the second-stage disparity computation.

As an example, the SAD (sum of absolute differences) aggregation algorithm is adopted, cost aggregation may be performed on the matching costs corresponding to the same disparity in the cost volume by using the following formula, to obtain the cumulative cost of the point p(x, y) at the disparity d in the first image with the second size:

$$C^A(y, x, d) = \frac{1}{KW \cdot KH} \sum_{i=-(KH-1)/2}^{(KH-1)/2} \sum_{j=-\frac{KW-1}{2}}^{\frac{KW-1}{2}} C(y+i, x+j, d)$$

$$\delta(disp1(y, x), disp1(y+i, x+j)),$$

$$\delta(x, y) = \begin{cases} 1, & x = y \\ 0, & \text{otherwise} \end{cases};$$

where KW and KH may respectively represent the width and height of the corresponding aggregation window (that is, the aggregation window may be expressed as KW×KH), and may be measured in pixels, and their values may be flexibly set according to actual situations, for example, may both be set to 9.

According to some embodiments, after the cumulative cost of each pixel in the first image with the second size at each disparity within the disparity search range corresponding to the second-stage disparity computation is obtained, the minimum cumulative cost may be selected by using the WTA (Winner-take-all) algorithm, to determine the disparity adjustment value disp2 between each pixel in the first image with the second size and each matching pixel in the second image with the second size based on the minimum cumulative cost.

Correspondingly, after the disparity adjustment value disp2 between each pixel in the first image with the second size and each matching pixel in the second image with the second size is determined, disp2 and the corresponding initial disparity (or the disparity offset) disp1 determined based on the upsampled disparity map with the second size may be added, to obtain the final disparity between each pixel in the first image with the second size and each matching pixel in the second image with the second size, and further to obtain the second disparity map with the second size.

With reference to the related formulas, the foregoing describes the process of using the local area-based matching method to perform block S303 of performing disparity computation based on the image feature related to the first image, the image feature related to the second image, and the disparity search range corresponding to the second-stage disparity computation, to obtain the disparity adjustment map with the second size. The process of using the local area-based matching method to perform block S403 of performing disparity computation based on the image feature related to the first image, the image feature related to the second image, and the disparity search range corresponding to the second-stage disparity computation to obtain the second disparity map with the second size is similar to the process of using the local area-based matching method to perform block S303, and details will not be described.

For example, similar to block S303, block S403 of performing disparity computation based on the image feature related to the first image, the image feature related to the second image, and the disparity search range corresponding to the second-stage disparity computation to obtain the second disparity map with the second size may include: constructing a cost volume based on the image feature related to the first image, the image feature related to the second image, and the disparity search range corresponding to the second-stage disparity computation; and determining the disparity between each pair of matching pixels in the first image with the second size and the second image with the second size based on the cost volume, to obtain the second disparity map with the second size.

It should be noted that, in this case, the point C(p, d) (that is, the matching cost C(p, d), of the point p(x, y) at the disparity d in the first image $I_1$ with the corresponding size (namely, the second size)) in the constructed cost volume may be used to represent the difference between the point p(x, y) in the first image $I_1$ with the corresponding size and the point q(x−d, y) in the second image $I_2$ with the corresponding size (namely, the second size). The value range of d may be determined according to the disparity search range corresponding to the second-stage disparity computation in this case and carrying the corresponding disparity offset. For example, when the disparity search range corresponding to the second-stage disparity computation and carrying the corresponding disparity offset is expressed as [−$D_0$+disp1, $D_0$+disp1], the value range of d may be expressed as [−$D_0$+disp1, $D_0$+disp1]. Herein, disp1(p) may represent the initial disparity, determined based on the upsampled disparity map with the corresponding size (namely, the second size), of a point p in the first image $I_1$ with the corresponding size.

According to some embodiments, determining the disparity between each pair of matching pixels in the first image with the second size and the second image with the second size based on the cost volume may include: performing cost aggregation on matching costs in the cost volume based on an aggregation window corresponding to the second-stage disparity computation; determining a minimum cumulative cost of each pixel in the first image with the second size within the disparity search range corresponding to the second-stage disparity computation, based on a result of the cost aggregation; and determining the disparity between each pixel in the first image with the second size and each matching pixel in the second image with the second size based on the minimum cumulative cost.

According to some embodiments, as described above, performing cost aggregation on matching costs in the cost volume based on the aggregation window corresponding to the second-stage disparity computation may include: performing cost aggregation on matching costs corresponding to the same disparity in the cost volume based on the aggregation window corresponding to the second-stage disparity computation.

In addition, it can be learned from the foregoing related description that, the second disparity map with the second size can be directly obtained by using the disparity computation method corresponding to block S403, while in the disparity computation method corresponding to block S303, the disparity adjustment map with the second size may be first obtained, and then the disparity adjustment map with the second size is combined (for example, added) with the upsampled disparity map with the second size, to obtain the second disparity map with the second size.

In addition, as described above, using the local area-based matching method to perform the process, in other stages of disparity computation (including the first-stage disparity computation), of performing disparity computation based on the image features related to the first and second images and a corresponding disparity search range, to obtain the disparity adjustment map or the disparity map with the corresponding size is similar to the above corresponding process in the second-stage disparity computation, and the difference lies in that for the first-stage disparity computation, the image feature related to the target image on which the first-stage disparity computation is based or the disparity search range does not carry the corresponding disparity offset. In other words, during disparity computation using the local area-based matching method, different from each subsequent stage of disparity computation including the second-stage disparity computation, for the first-stage disparity computation, the point C(p, d) (that is, the matching cost C(p, d) of the point p(x, y) at the disparity d in the first image $I_1$ with the corresponding size (namely, the first size)) in the constructed cost volume may be used to represent the difference between the point P(x, y) in the first image $I_1$ with the corresponding size and the point q(x−d, y) in the second image $I_2$ with the corresponding size (namely, the first size). The value range of d may be determined according to the disparity search range corresponding to the first-stage disparity computation. For example, when the disparity search range corresponding to the first-stage disparity computation is expressed as $$\left[0, \frac{D}{2}\right],$$

the value range of d may be expressed as $$\left[0, \frac{D}{2}\right].$$

In addition, the disparity search range corresponding to the first-stage disparity computation does not carry the disparity offset.

As an alternative, performing disparity computation based on the image feature related to the first image, the image feature related to the second image, and the disparity search range corresponding to the second-stage disparity computation, to obtain disparity adjustment map with the second size (corresponding to block S303) may include: determining a disparity generation neural network, in which the disparity generation neural network is configured to determine the disparity adjustment value between each pair of matching pixels in the image pair based on the image feature of each image in the image pair and the corresponding disparity search range, to obtain the disparity adjustment map with the corresponding size; and processing the image feature related to the first image, the image feature related to the second image, and the disparity search range corresponding to the second-stage disparity computation based on the disparity generation neural network, to obtain the disparity adjustment map with the second size.

Similarly, performing disparity computation based on the image feature related to the first image, the image feature related to the second image, and the disparity search range corresponding to the second-stage disparity computation, to obtain the second disparity map with the second size (corresponding to block S403) may include: determining a disparity generation neural network, in which the disparity generation neural network is configured to determine the disparity between each pair of matching pixels in an image pair based on the image feature of each image in the image pair and the corresponding disparity search range, to obtain the disparity map with the corresponding size; and processing the image feature related to the first image, the image feature related to the second image, and the disparity search range corresponding to the second-stage disparity computation based on the disparity generation neural network, to obtain the second disparity map with the second size.

In other words, in addition to adopting the local area-based matching method to perform respective stages of disparity computation (including the first-stage disparity computation and the second-stage disparity computation), and the method based on a neural network may also be adopted to select an appropriate neural network to perform respective stages of disparity computation. The method based on the neural network can obtain a larger receptive field by constructing the disparity network, and the effect of disparity determining is better.

According to some embodiments, each disparity generation neural network may be any convolutional neural network capable of implementing corresponding disparity processing functions, such as 2DCNN (two-dimensional deep convolutional neural network) or 3DCNN (three-dimensional deep convolutional neural network). By using the convolutional neural network as the disparity generation network, a larger receptive field can be obtained, thereby improving the precision of the obtained disparity map.

According to some embodiments, the disparity generation neural network using the 2DCNN structure may include the correlation layer and the first number (for example, 3-5, or other corresponding values flexibly selected according to actual needs) of sequentially cascaded convolutional layers, and the convolution manner of each convolutional layer may be, for example, depthwise separable convolution. The disparity generation neural network using the 3DCNN structure may include the shift concatenate layer and the second number (for example, 3-7, or other corresponding values flexibly selected according to actual needs) of sequentially cascaded convolutional layers.

According to some embodiments, for the disparity generation neural network using the 2DCNN structure, the function of the correlation layer included therein may be similar to constructing a cost volume based on the image feature related to the first image, the image feature related to the second image, and the disparity search range corresponding to the second-stage disparity computation described in the foregoing embodiment. For the disparity generation neural network using the 3DCNN structure, the function of the shift concatenate layer included therein is similar to constructing the cost volume based on the image feature related to the first image, the image feature related to the second image, and the disparity search range corresponding to the second-stage disparity computation described in the foregoing embodiment. Correspondingly, carrying the disparity offset determined based on the upsampled disparity map with the second size in the image feature related to the second image or in the disparity search range corresponding to the second-stage disparity computation may refer to considering (e.g., superimposing) the disparity offset determined based on the upsampled disparity map with the second size when the correlation layer operation or the shift concatenate layer operation is performed.

According to some embodiments, the number of convolutional layers included in the disparity generation neural network configured for the first-stage disparity computation may be greater than the number of convolutional layers included in the disparity generation neural network used configured other stages of disparity computation, so as to improve the precision of the initial disparity map obtained by the first-stage disparity computation, and further improve the precision of the entire disparity computation process.

In addition, it should be noted that for disparity computation using the method based on the neural network, the image feature related to the first image and the image feature related to the second image on which the disparity computation is based can also be implemented by using the feature extraction neural network configured to extract the image feature of each image in the image pair. Thereby, the efficiency of image feature extraction can be improved and the efficiency of disparity computation can be improved.

According to some embodiments, the disparity generation neural network and/or the feature extraction neural network configured for various stages of disparity computation can be obtained by supervised training or unsupervised training. Supervised training usually uses existing training samples (such as labeled data) to learn the mapping from input to output, and then applies this mapping relationship to unknown data to achieve the purpose of classification or regression. Algorithms for supervised training may include, for example, a logistic regression algorithm, an SVM (Support Vector Machine) algorithm, and a decision-tree algorithm. The difference between unsupervised training and supervised training is that, unsupervised training does not require training samples, and unlabeled data is directly modeled to find out the rules. Typical algorithms for unsupervised training may include, for example, a clustering algorithm and a random forest (Random forests) algorithm.

According to some embodiments, the disparity generation neural network and/or the feature extraction neural network used for various stages of disparity computation may the neural network pre-trained based on the training sample set. This can improve disparity processing efficiency. Certainly, according to actual needs, the disparity generation neural network and/or the feature extraction neural network configured for various stages of disparity computation may also be obtained through real-time training based on a training sample set, or may be obtained by optimizing the pre-trained neural network in real time or regularly based on the updated training sample set, to improve the accuracy of disparity computation.

For example, the overall working process of the disparity determining method including two stages of disparity computation of an exemplary embodiment of the present disclosure will be illustratively described below with reference to FIG. 5. Various stages of disparity computation all may be performed by using the local area-based matching method.

Figure 5:
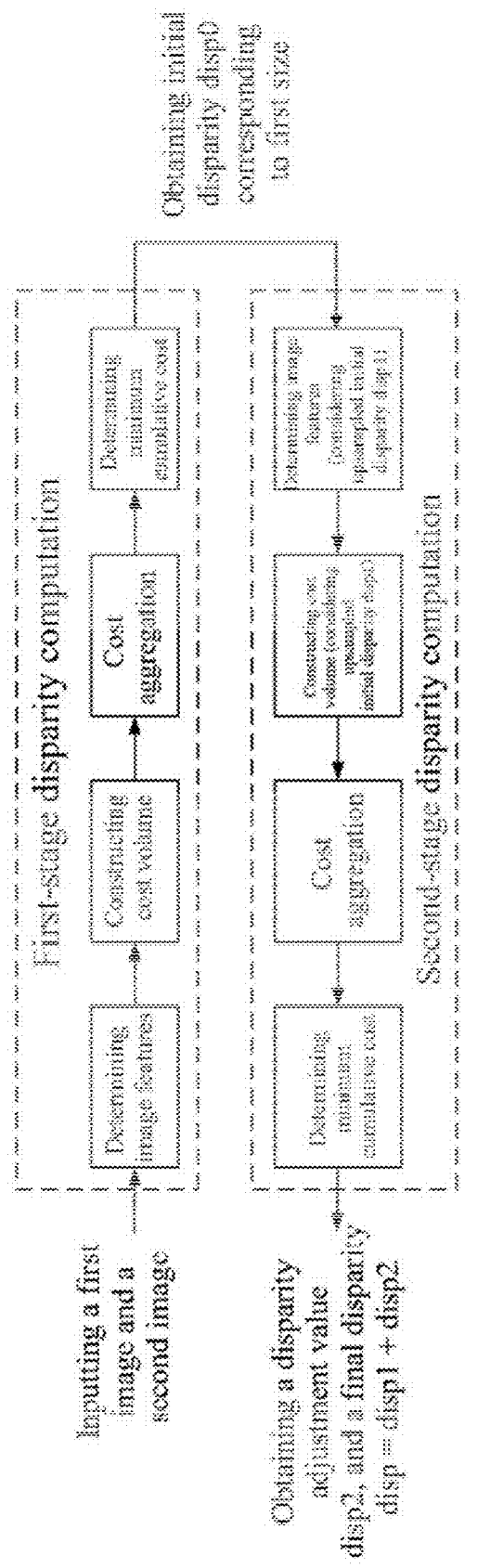
FIG. 5 is a schematic diagram illustrating an overall framework of a disparity determining method including two stages of disparity computation according to some exemplary embodiments of the present disclosure.

As shown in FIG. 5, FIG. 5 is a schematic diagram illustrating an overall framework of a disparity determining method including two stages of disparity computation according to some exemplary embodiments of the present disclosure. The disparity determining method may include first-stage disparity computation for computing the downsampling disparity (namely, the initial disparity), and second-stage disparity computation for disparity refinement based on the initial disparity. Each stage of disparity computation may include operations such as determining image features, constructing the cost volume, the cost aggregation (namely, cost filtering), and determining the minimum cumulative cost.

As an example, the original size of images (namely, the first image and the second image) in the image pair to be processed may be expressed as H (which may be called full size), and the value of the upsampling step or the downsampling step between the images on which two adjacent stages of disparity computation are based is 2, the size (namely, the first size) of the downsampled first image and the downsampled second image on which the first-stage disparity computation is based may be expressed as $$\frac{H}{2} \times \frac{W}{2}$$

(which may be called ½ size), and the corresponding disparity search range may be reduced to $$\left[0, \frac{D}{2}\right],$$

where D may represent the maximum disparity search value of the original images of the first image and the second image, and the value of D may be related to focal length of the camera lenses and/or the distances between the camera lenses in the multiocular camera for capturing the first image and the second image (similar to the height H and the width W of the image, D may be measured in pixels). The size (namely, the second size) of the image on which the second-stage disparity computation is based is the full size H×W, and the corresponding disparity search range may be set to $[-D_0, D_0]$, where $D_0$ is a positive value not greater than $M_0(K-1)$, and as described in the foregoing related embodiments, K may represent the upsampling step, $M_0$ may represent the maximum disparity error corresponding to the first-stage disparity computation, and is a value not less than 1. In addition, for the convenience of denotation, in the followings, $I_1$ and $I_2$ are still used to denote the downsampled first image and the downsampled second image obtained, and the signs of the images with different sizes are not distinguished.

For example, in the operation of determining the image feature of the first-stage disparity computation, taking the first image $I_1$ with the first size as an example, the RGB components of each pixel and the gradient (for example, the horizontal gradient) of each pixel in the first image $I_1$ may be determined as the corresponding image features. The horizontal gradient of the point $p_1(x, y)$ in the first image $I_1$ may be determined in the following manner. Let $p_1(x, y)$ and $p_2(x-1, y)$ denote two adjacent points in the first image $I_1$, the horizontal gradient of the point $p_1$ in the first image $I_1$ may be expressed as $$\nabla_x(I_1(p_1)) = \frac{I_1^r(p_1) + I_1^g(p_1) + I_1^b(p_1)}{3} - \frac{I_1^r(p_2) + I_1^g(p_2) + I_1^b(p_2)}{3},$$

where $I_1^r(p_1)$, $I_1^g(p_1)$, and $I_1^b(p_1)$ may represent the R, G, and B components of the point $p_1$ in the first image $I_1$, respectively, and $I_1^r(p_2)$, $I_1^g(p_2)$, and $I_1^b(p_2)$ may represent the R, G, and B components of the point $p_2$ in the first image $I_1$, respectively.

After the image features of the first image $I_1$ with the first size and the second image $I_2$ with the first size are obtained, in the operation of constructing the cost volume of the first-stage disparity computation, the cost volume may be constructed in the following manner, and the size of the cost volume may be expressed as $$\frac{W}{2} \times \frac{H}{2} \times \frac{D}{2}.$$

Based on the determined RGB components and gradient (such as the horizontal gradient) of each pixel in the first image $I_1$ and the determined RGB components and gradient (such as the horizontal gradient) of each pixel in the second image $I_2$, their color difference and gradient difference are determined. The color difference may be expressed as $$M(p, d) = \sum_{i=1}^{3} |I_1^i(p) - I_2^i(q)|,$$

where the three values 1, 2, and 3 of i may represent the R, G, and B components, respectively. The gradient difference (for example, the horizontal gradient difference) may be expressed as $G(p, d) = |\nabla_x(I_1(p)) - \nabla_x(I_2(q))|$, where $\nabla_x(I_1(p))$ may represent the horizontal gradient of the point p in the first image $I_1$ with the first size, and $\nabla_x(I_2(q))$ may represent the horizontal gradient of a point q in the second image $I_2$ with the first size. The value range of d may be determined according to the disparity search range corresponding to the first-stage disparity computation. For example, the value range of d may be $$\left[0, \frac{D}{2}\right].$$

Based on the determined color difference and gradient difference, the cost volume may be constructed by the formula: $C(p, d) = \alpha \cdot \min(T_c, M(p, d)) + (1-\alpha) \cdot \min(T_g, G(p, d))$, where the point $C(p, d)$ (that is, the matching cost $C(p, d)$ of the point $p(x, y)$ at the disparity d in the first image $I_1$ with the first size) in the cost volume may be used to represent the difference between the point $p(x, y)$ in the first image $I_1$ with the first size and the point $q(x-d, y)$ in the second image $I_2$ with the first size; α is the weight that can be used to balance the color term and the gradient term, $T_c$ and $T_g$ may respectively represent truncated values related to the color term and the gradient term, and values of the three can be flexibly set according to actual situations. For example, it can be set that α=0.9, Tc=21, and Tg=4, which not limited herein.

After the cost volume is constructed, in the operation of cost aggregation of the first-stage disparity computation, for example, the SAD aggregation algorithm is used, cost aggregation may be performed on matching costs corresponding to the same disparity in the cost volume by using the following formula to obtain the cumulative cost of the point P(x,y) at the disparity d in the first image $I_1$ with the first size:

$$C^A(y, x, d) = \frac{1}{KW \cdot KH} \sum_{i=-(KH-1)/2}^{(KH-1)/2} \sum_{j=-(KW-1)/2}^{(KW-1)/2} C(y+i, x+j, d),$$

where KW and KH may respectively represent the width and height of the corresponding aggregation window (that is, the aggregation window may be expressed as KW×KH), and may be measured in pixels, and their values may be flexibly set according to actual situations, for example, may both be set to 9.

After the cumulative cost of each pixel in the first image $I_1$ with the first size at each disparity within the disparity search range corresponding to the first-stage disparity computation is obtained, in the last operation of the first-stage disparity computation, the minimum cumulative cost may be selected based on the WTA algorithm by using the following formula, to determine the corresponding initial disparity disp0; disp0(y, x)=argmin$_{i=0, \ldots, D/2}C^A$ (y, x, i).

The initial disparity disp0, the first image $I_1$ with the full size, and the second image $I_2$ with the full size may be used together as the input to the next stage of disparity computation (namely, the second-stage disparity computation), to determine the corresponding image feature. In addition, since the size of the initial disparity disp0 is half the size of the original image of the first image and the second image, it may be upsampled as disp1=2*upsample(disp0), to obtain the initial disparity disp1 corresponding to the full size.

For example, each operation of the second-stage disparity computation can be performed in the similar manner to each corresponding operation of the first-stage disparity computation, except that each pixel may correspond to an initial disparity disp1. In other words, as an example, the determined image feature related to the first image or the determined image feature related to the second image includes the RGB components of each pixel and the gradient (for example, the horizontal gradient) of each pixel in the image, the point C(p, d) (that is, the matching cost C(p, d) of the point p(x, y) at the disparity d in the first image $I_1$ with the full size (namely, the second size)) in the constructed cost volume in the second-stage disparity computation may be used to represent the difference between the point p(x, y) in the first image $I_1$ with the full size and the point q(x−d−disp1(p), y) in the second image $I_2$ with the full size (namely, the second size). The value range of d may be determined according to the disparity search range [−$D_0$, $D_0$] corresponding to the second-stage disparity computation. For example, the value range of d may be expressed as [−$D_0$, $D_0$].

In addition, it should be noted that, for example, when the SAD aggregation algorithm is used for cost aggregation, the formula used in the cost aggregation operation of the second-stage disparity computation may be as follows:

$$C^A(y, x, d) = \frac{1}{KW \cdot KH} \sum_{i=-(KH-1)/2}^{(KH-1)/2} \sum_{j=-\frac{KW-1}{2}}^{\frac{KW-1}{2}} C(y+i, x+j, d)$$

$$\delta(disp1(y, x), disp1(y+i, x+j)),$$

$$\delta(x, y) = \begin{cases} 1, & x = y \\ 0, & \text{otherwise} \end{cases};$$

where KW and KH respectively represent the width and height of the corresponding aggregation window, and may be measured in pixels, and their values may be flexibly set according to actual situations, for example, may both be set to 9. In addition, sizes of aggregation windows corresponding to different stages of disparity computation may also be set to be different.

Correspondingly, after the cumulative cost is obtained, in the last operation of the second-stage disparity computation, the minimum cumulative cost may be selected by using the WTA algorithm to determine the corresponding disparity adjustment value disp2, and then the initial disparity disp1 and the disparity adjustment value disp2 may be added to obtain the refined disparity, i.e., the final disparity disp=disp1+disp2. It should be noted that, this example is described based on the disparity computation method corresponding to FIG. 3. When the steps such as construction of the cost volume and cost aggregation, and determination of the minimum cumulative cost are all replaced with the corresponding steps in the disparity computation method corresponding to FIG. 4, the required disparity may be directly computed without computing the disparity adjustment value.

It can be learned from the foregoing description that, compared with directly using the image with the full size to compute the disparity, the total computation amount required for the disparity computation process shown in FIG. 5 in the present disclosure may be $$\frac{1}{8} + \frac{2 \cdot D_0 + 1}{D}$$

of that required when the disparity is computed directly using the image with the full size, such that the computation amount is significantly reduced, and the speed of disparity computation is greatly improved.

Figure 6A:
FIG. 6A and FIG. 6B are schematic diagrams illustrating a reference image and a corresponding disparity map with ground truth according to some exemplary embodiments of the present disclosure, respectively.
Figure 6B:
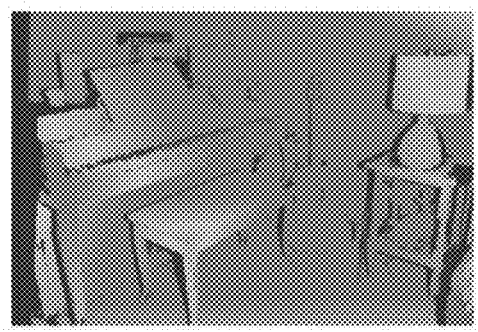
Figure 6C:
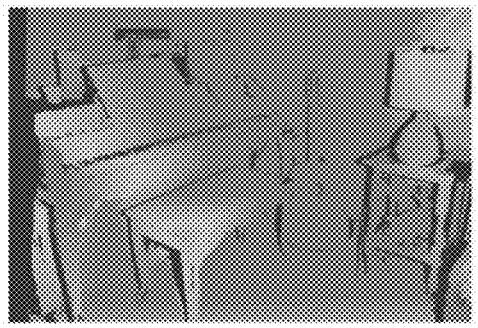
FIG. 6C and FIG. 6D are respectively schematic diagrams illustrating an upsampled initial disparity map and an optimized disparity map obtained by performing two stages of disparity processing based on the reference image shown in FIG. 6A in a disparity determining method according to an exemplary embodiment of the present disclosure.
Figure 6D:
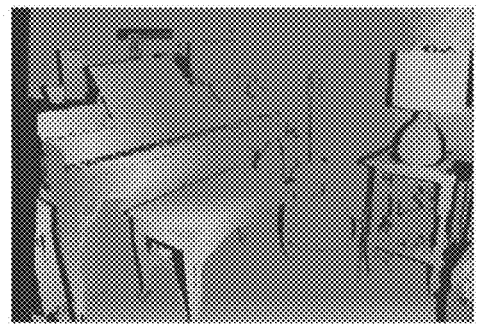

With reference to FIG. 6A, FIG. 6B, FIG. 6C, and FIG. 6D, the result obtained by testing on Middlebury public dataset based on the reference image will be illustratively described below. FIG. 6A and FIG. 6B are respectively schematic diagrams illustrating a reference image and a corresponding disparity map with ground truth according to exemplary embodiments of the present disclosure. FIG. 6C and FIG. 6D are respectively schematic diagrams illustrating an upsampled initial disparity map and an optimized disparity map obtained by performing two stages of disparity processing based on the reference image shown in FIG. 6A in the disparity determining method according to exemplary embodiments of the present disclosure. It can be seen from the above figures that, the refined disparity result (the result obtained by the last-stage disparity computation) is smoother than the upsampled initial disparity result, and the disparity is more continuous.

In addition, although FIG. 6A to FIG. 6D respectively illustrate the reference image, the disparity map with ground truth, the upsampled initial disparity map, and the optimized disparity map in the form of grayscale images, it can be understood that when the reference image shown in FIG. 6A is the color image, the disparity maps shown in FIG. 6B to FIG. 6D may also be corresponding color images.

In addition, although not shown, the obtained disparity map, such as the refined disparity map (that is, the disparity map obtained by the last-stage disparity computation), may further be provided to the corresponding target device for further processing, for example, to the corresponding target device, such that the target device obtains the depth map through computation based on the disparity map, and then obtains depth information of the scene, to be used in various application scenarios such as three-dimensional reconstruction, automated driving, and obstacle detection.

In addition, as described in the foregoing related embodiments, if disparity maps obtained by other stages of disparity computation are also taken as the disparity computation results in addition to the disparity map obtained by the last-stage disparity computation, the disparity map whose size matches performance of the target device may be selected from the multiple disparity maps based on the performance of the target device, and used as the disparity map finally provided to the target device. For example, when the target device has high performance and/or requires the disparity map with high precision, the disparity map with a large size may be selected from the multiple disparity maps and provided to the target device.

The exemplary disparity determining methods according to the present disclosure have been described above with reference to FIG. 1 to FIG. 6D. Exemplary embodiments of an exemplary electronic device of the present disclosure will be further described below with reference to FIG. 7. It should be noted that various definitions, embodiments, implementations, examples and the like described above with reference to FIG. 1 to FIG. 6D may also be applied to or combined with the exemplary embodiments described below.

An aspect of the present disclosure may include an electronic device. The electronic device may include: a processor; and a memory that stores a program, the program including instructions that, when executed by the processor, cause the electronic device to perform any of the foregoing methods.

An aspect of the present disclosure may include a computer-readable storage medium storing a program, the program including instructions that, when executed by a processor of an electronic device, cause the electronic device to perform any of the foregoing methods.

Figure 7:
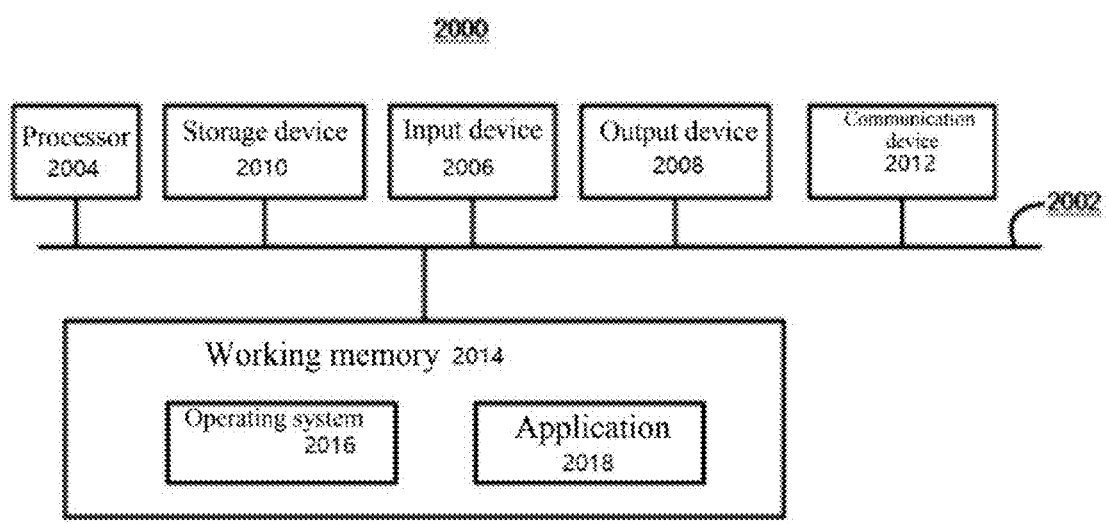
FIG. 7 is a block diagram illustrating an exemplary computing device applicable to some exemplary embodiments of the present disclosure.

A computing device 2000 will be described below with reference to FIG. 7, which is an example of a hardware device that can be applied to various aspects of the present disclosure. The computing device 2000 may be any machine configured to perform processing and/or computation, which may be, but is not limited to, a workstation, a server, a desktop computer, a laptop computer, a tablet computer, a personal digital assistant, a smartphone, an onboard computer, or any combination thereof.

The computing device 2000 may include elements in connection with a bus 2002 or in communication with a bus 2002 (possibly via one or more interfaces). For example, the computing device 2000 may include the bus 2002, one or more processors 2004, one or more input devices 2006, and one or more output devices 2008. The one or more processors 2004 may be any type of processors and may include, but are not limited to, one or more general purpose processors and/or one or more dedicated processors (e.g., special processing chips). The input device 2006 may be any type of device capable of inputting information to the computing device 2000, and may include, but is not limited to, a mouse, a keyboard, a touch screen, a microphone and/or a remote controller. The output device 2008 may be any type of device capable of presenting information, and may include, but is not limited to, a display, a speaker, a video/audio output terminal, a vibrator, and/or a printer. The computing device 2000 may further include a storage device 2010 or is connected to a storage device 2010. The storage device may be any non-transitory storage device capable of implementing data storage, and may include, but is not limited to, a disk drive, an optical storage device, a solid-state memory, a floppy disk, a flexible disk, a hard disk, a magnetic tape, or any other magnetic medium, an optical disk or any other optical medium, a read-only memory (ROM), a random access memory (RAM), a cache memory and/or any other memory chip or cartridge, and/or any other medium from which a computer can read data, instructions and/or code. The storage device 2010 can be removed from an interface. The storage device 2010 may have data/programs (including instructions)/code for implementing the foregoing methods and steps (for example, the methods and steps shown in the flowcharts of FIG. 1 to FIG. 4). The computing device 2000 may further include a communication device 2012. The communication device 2012 may be any type of device or system that enables communication with an external device and/or network, and may include, but is not limited to, a modem, a network interface card, an infrared communication device, a wireless communication device and/or a chipset, e.g., a Bluetooth™ device, a 1302.11 device, a Wi-Fi device, a WiMax device, a cellular communication device and/or the like.

The computing device 2000 may further include a working memory 2014, which may be any type of working memory that stores programs (including instructions) and/or data useful to the working of the processor 2004, and may include, but is not limited to, a random access memory and/or a read-only memory.

Software elements (programs) may be located in the working memory 2014, and may include, but is not limited to, an operating system 2016, one or more applications (namely, application programs) 2018, drivers, and/or other data and code. The instructions for performing the foregoing methods and steps (for example, the methods and steps shown in the flowcharts of FIG. 1 to FIG. 4) may be included in the one or more applications 2018, and the methods and steps can be implemented by the instructions of the one or more applications 2018 being read and executed by the processor 2004. Executable code or source code of the instructions of the software elements (programs) may be stored in a non-transitory computer-readable storage medium (e.g., the storage device 2010), and may be stored in the working memory 2014 when executed (may be compiled and/or installed). The executable code or source code of the instructions of the software elements (programs) may also be downloaded from a remote location.

It should further be appreciated that various variations may be made according to specific requirements. For example, tailored hardware may also be used, and/or specific elements may be implemented in hardware, firmware, middleware, microcode, hardware description languages, or any combination thereof. For example, some or all of the disclosed methods and devices may be implemented by programming hardware (for example, a programmable logic circuit including a field programmable gate array (FPGA) and/or a programmable logic array (PLA)) in an assembly language or a hardware programming language (such as VERILOG, VHDL, and C++) by using the logic and algorithm in accordance with the present disclosure.

It should further be understood that the foregoing methods may be implemented in a server-client mode. For example, the client may receive data input by a user and send the data to the server. Alternatively, the client may receive data input by the user, perform a part of processing in the foregoing method, and send data obtained after the processing to the server. The server may receive the data from the client, perform the foregoing method or another part of the foregoing method, and return an execution result to the client.

The client may receive the execution result of the method from the server, and may present same to the user, for example, through an output device.

It should further be understood that the components of the computing device 2000 can be distributed over a network. For example, some processing may be executed by one processor while other processing may be executed by another processor away from the one processor. Other components of the computing device 2000 may also be similarly distributed. As such, the computing device 2000 can be interpreted as a distributed computing system that performs processing at a plurality of locations.

Although the embodiments or examples of the present disclosure have been described with reference to the accompanying drawings, it should be appreciated that the methods, systems and devices described above are merely exemplary embodiments or examples, and the scope of the present invention is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A disparity determining method, comprising:
    downsampling a first image and a second image, to obtain a first image with a first size and a second image with the first size;
    performing a first stage of disparity computation on the first image with the first size and the second image with the first size, to obtain a first disparity map with the first size;
    upsampling the first disparity map to obtain an upsampled disparity map with a second size; and
    performing a second stage of disparity computation on a first image with the second size and a second image with the second size based on the upsampled disparity map with the second size to obtain a second disparity map with the second size;
    wherein performing the second stage of disparity computation on the first image with the second size and the second image with the second size based on the upsampled disparity map with the second size to obtain the second disparity map with the second size comprises:
    determining an image feature related to the first image and an image feature related to the second image on which the second stage of disparity computation is based, based on the first image with the second size and the second image with the second size;
    determining a disparity search range corresponding to the second stage of disparity computation; and
    determining the second disparity map with the second size based on the image feature related to the first image, the image feature related to the second image, and the disparity search range corresponding to the second stage of disparity computation;
    wherein the image feature related to the second image carries a disparity offset determined based on the upsampled disparity map with the second size, or the disparity search range corresponding to the second stage of disparity computation is determined based on the upsampled disparity map with the second size.

2. The disparity determining method of claim 1, further comprising:
    in response to a number of times of disparity computation not reaching a threshold of times, cyclically performing an operation of performing a next stage of disparity computation on a first image with a size corresponding to the next stage of disparity computation and a second image with the size corresponding to the next stage of disparity computation based on an upsampled disparity map, with the size corresponding to the next stage of disparity computation, of a disparity map obtained by a current stage of disparity computation, until it is determined that the number of times of disparity computation reaches the threshold of times; and
    taking a disparity map obtained by a last stage of disparity computation as a final disparity map between the first image and the second image, wherein a size corresponding to each stage of disparity computation is a size of an image on which this stage of disparity computation is based.

3. The disparity determining method of claim 1, wherein a size of a disparity map obtained by a last stage of disparity computation in respective stages of disparity computation is consistent with original sizes of the first image and the second image.

4. The disparity determining method of claim 1, wherein when the image feature related to the second image carries the disparity offset determined based on the upsampled disparity map with the second size, determining the second disparity map with the second size based on the image feature related to the first image, the image feature related to the second image, and the disparity search range corresponding to the second stage of disparity computation, comprises:
    performing disparity computation based on the image feature related to the first image, the image feature related to the second image, and the disparity search range corresponding to the second stage of disparity computation, to obtain a disparity adjustment map with the second size; and
    combining the upsampled disparity map with the second size and the disparity adjustment map with the second size, to obtain the second disparity map with the second size.

5. The disparity determining method of claim 4, wherein the disparity search range corresponding to the second stage of disparity computation is expressed as $[-D_0, D_0]$, and $D_0$ is a positive value not greater than $M_0(K-1)$,
    wherein K represents an upsampling step between the first disparity map and the upsampled disparity map with the second size, and is a value not less than 1, and $M_0$ represents a maximum disparity error corresponding to the first stage of disparity computation, and is a value not less than 1.

6. The disparity determining method of claim 4, wherein the image feature related to the first image or the image feature related to the second image comprises at least one of:
    RGB components of each pixel and a gradient of each pixel in the image.

7. The disparity determining method of claim 4, wherein performing disparity computation based on the image feature related to the first image, the image feature related to the second image, and the disparity search range corresponding to the second stage of disparity computation, to obtain the disparity adjustment map with the second size comprises:

constructing a cost volume based on the image feature related to the first image, the image feature related to the second image, and the disparity search range corresponding to the second stage of disparity computation; and determining a disparity adjustment value between each pair of matching pixels in the first image with the second size and the second image with the second size based on the cost volume, to obtain the disparity adjustment map with the second size.

8. The disparity determining method of claim 7, wherein determining the disparity adjustment value between each pair of matching pixels in the first image with the second size and the second image with the second size based on the cost volume comprises:

performing cost aggregation on matching costs in the cost volume based on an aggregation window corresponding to the second stage of disparity computation;

determining a minimum cumulative cost of each pixel in the first image with the second size within the disparity search range corresponding to the second stage of disparity computation, based on a result of the cost aggregation; and determining the disparity adjustment value between each pixel in the first image with the second size and each matching pixel in the second image with the second size, based on the minimum cumulative cost.

9. The disparity determining method of claim 4, wherein performing disparity computation based on the image feature related to the first image, the image feature related to the second image, and the disparity search range corresponding to the second stage of disparity computation, to obtain the disparity adjustment map with the second size comprises:

determining a disparity generation neural network, the disparity generation neural network being configured to determine a disparity adjustment value between each pair of matching pixels in an image pair based on an image feature of each image in the image pair and a corresponding disparity search range, to obtain a disparity adjustment map with a corresponding size; and processing the image feature related to the first image, the image feature related to the second image, and the disparity search range corresponding to the second stage of disparity computation based on the disparity generation neural network, to obtain the disparity adjustment map with the second size.

10. The disparity determining method of claim 1, wherein when the disparity search range corresponding to the second stage of disparity computation is determined based on the upsampled disparity map with the second size, determining the second disparity map with the second size based on the image feature related to the first image, the image feature related to the second image, and the disparity search range corresponding to the second stage of disparity computation, comprises:

performing disparity computation based on the image feature related to the first image, the image feature related to the second image, and the disparity search range corresponding to the second stage of disparity computation, to obtain the second disparity map with the second size.

11. The disparity determining method of claim 10, wherein determining the disparity search range corresponding to the second stage of disparity computation based on the upsampled disparity map with the second size comprises:

determining a disparity search adjustment range corresponding to the second stage of disparity computation, based on an upsampling step between the first disparity map and the upsampled disparity map with the second size, and a maximum disparity error corresponding to the first stage of disparity computation; and adjusting the disparity search adjustment range corresponding to the second stage of disparity computation by using a disparity value in the upsampled disparity map with the second size as a reference, to obtain the disparity search range corresponding to the second stage of disparity computation and carrying a corresponding disparity offset.

12. The disparity determining method of claim 11, wherein the disparity search adjustment range corresponding to the second stage of disparity computation is expressed as $[-D_0, D_0]$, and the disparity search range corresponding to the second stage of disparity computation and carrying the corresponding disparity offset is expressed as $[-D_0+disp1, D_0+disp1]$, wherein disp1 represents the disparity value in the upsampled disparity map with the second size, $D_0$ is a positive value not greater than $M_0(K-1)$, K represents the upsampling step and is a value not less than 1, and $M_0$ represents the maximum disparity error corresponding to the first stage of disparity computation and is a value not less than 1.

13. The disparity determining method of claim 10, wherein the image feature related to the first image or the image feature related to the second image comprises at least one of:

RGB components of each pixel and a gradient of each pixel in the image.

14. The disparity determining method of claim 10, wherein performing disparity computation based on the image feature related to the first image, the image feature related to the second image, and the disparity search range corresponding to the second stage of disparity computation, to obtain the second disparity map with the second size comprises:

constructing a cost volume based on the image feature related to the first image, the image feature related to the second image, and the disparity search range corresponding to the second stage of disparity computation; and determining a disparity between each pair of matching pixels in the first image with the second size and the second image with the second size based on the cost volume, to obtain the second disparity map with the second size.

15. The disparity determining method of claim 14, wherein determining the disparity between each pair of matching pixels in the first image with the second size and the second image with the second size based on the cost volume comprises:

performing cost aggregation on matching costs in the cost volume based on an aggregation window corresponding to the second stage of disparity computation;

determining a minimum cumulative cost of each pixel in the first image with the second size within the disparity search range corresponding to the second stage of disparity computation, based on a result of the cost aggregation; and determining the disparity between each pixel in the first image with the second size and each matching pixel in the second image with the second size, based on the minimum cumulative cost.

16. The disparity determining method of claim 10, wherein performing disparity computation based on the image feature related to the first image, the image feature related to the second image, and the disparity search range corresponding to the second stage of disparity computation, to obtain the second disparity map with the second size comprises:
determining a disparity generation neural network, the disparity generation neural network being configured to determine a disparity between each pair of matching pixels in an image pair based on an image feature of each image in the image pair and a corresponding disparity search range, to obtain a disparity map with a corresponding size; and
processing the image feature related to the first image, the image feature related to the second image, and the disparity search range corresponding to the second stage of disparity computation based on the disparity generation neural network, to obtain the second disparity map with the second size.

17. The disparity determining method of claim 1, wherein downsampling the first image and the second image to obtain the first image with the first size and the second image with the first size comprises:
determining a threshold of times of disparity computation;
determining a downsampling factor required for downsampling the first image and the second image, based on the threshold of times; and
downsampling the first image and the second image based on the downsampling factor, wherein the greater the threshold of times is, the greater the downsampling factor is.

18. The disparity determining method of claim 17, wherein the threshold of times is N, the downsampling factor is (N−1)th power of K, K is an upsampling step or a downsampling step between images on which two adjacent stages of disparity computation are based, K is a value not less than 1, and N is a positive integer not less than 2.

19. An electronic device, comprising:
a processor; and
a memory that stores a program, the program comprising instructions that, when executed by the processor, cause the processor to:
downsample a first image and a second image, to obtain a first image with a first size and a second image with the first size;
perform a first stage of disparity computation on the first image with the first size and the second image with the first size, to obtain a first disparity map with the first size;
upsample the first disparity map to obtain an upsampled disparity map with a second size; and
perform a second stage of disparity computation on a first image with the second size and a second image with the second size based on the upsampled disparity map with the second size to obtain a second disparity map with the second size;
wherein the instructions, when executed by the processor, further cause the processor to:
determine an image feature related to the first image and an image feature related to the second image on which the second stage of disparity computation is based, based on the first image with the second size and the second image with the second size;
determine a disparity search range corresponding to the second stage of disparity computation; and
determine the second disparity map with the second size based on the image feature related to the first image, the image feature related to the second image, and the disparity search range corresponding to the second stage of disparity computation;
wherein the image feature related to the second image carries a disparity offset determined based on the upsampled disparity map with the second size, or the disparity search range corresponding to the second stage of disparity computation is determined based on the upsampled disparity map with the second size.

20. A non-transitory computer-readable storage medium that stores a program, the program comprising instructions that, when executed by a processor of an electronic device, cause the electronic device to:
downsample a first image and a second image, to obtain a first image with a first size and a second image with the first size;
perform a first stage of disparity computation on the first image with the first size and the second image with the first size, to obtain a first disparity map with the first size;
upsample the first disparity map to obtain an upsampled disparity map with a second size; and
perform a second stage of disparity computation on a first image with the second size and a second image with the second size based on the upsampled disparity map with the second size to obtain a second disparity map with the second size;
wherein the instructions, when executed by the processor, further cause the electronic device to:
determine an image feature related to the first image and an image feature related to the second image on which the second stage of disparity computation is based, based on the first image with the second size and the second image with the second size;
determine a disparity search range corresponding to the second stage of disparity; computation; and
determine the second disparity map with the second size based on the image feature related to the first image, the image feature related to the second image, and the disparity search range corresponding to the second stage of disparity computation;
wherein the image feature related to the second image carries a disparity offset determined based on the upsampled disparity map with the second size, or the disparity search range corresponding to the second stage of disparity computation is determined based on the upsampled disparity map with the second size.

* * * * *